United States Patent
Erhart et al.

(10) Patent No.: US 7,142,661 B2
(45) Date of Patent: Nov. 28, 2006

(54) METHOD AND APPARATUS FOR INTERACTIVE VOICE PROCESSING WITH VISUAL MONITORING CHANNEL

(75) Inventors: George W. Erhart, Pataskala, OH (US); Valentine C. Matula, Granville, OH (US); David Skiba, Columbus, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 109 days.

(21) Appl. No.: 10/874,791

(22) Filed: Jun. 23, 2004

(65) Prior Publication Data

US 2005/0286707 A1    Dec. 29, 2005

(51) Int. Cl.
*H04M 3/00* (2006.01)
(52) U.S. Cl. .................................. 379/265.09
(58) Field of Classification Search ............ None
See application file for complete search history.

(56) References Cited

U.S. PATENT DOCUMENTS

| | | | |
|---|---|---|---|
| 6,408,064 B1 | 6/2002 | Fedorov et al. | |
| 2002/0095462 A1 | 7/2002 | Beck et al. | |
| 2003/0061029 A1* | 3/2003 | Shaket | 704/9 |
| 2004/0218751 A1* | 11/2004 | Colson et al. | 379/265.09 |
| 2005/0238161 A1* | 10/2005 | Yacoub et al. | 379/265.06 |

OTHER PUBLICATIONS

"Solutions for Any Customer-Centric Business," VoiceGenie Technologies Inc.—The Worldwide Leader in VoiceXML, downloaded on Oct. 20, 2004, http://www.voicegenie.com (2004).
"Nuance Products and Services Overview," Nuance Communications Inc., downloaded on Oct. 20, 2004, http://www.nuance.com (2004).
"Audium 3 . . . A complete platform to create and deliver better voise applications," Audium Corporation, downloaded on Oct. 20, 2004, http://www.audiumcorp.com (2004).

* cited by examiner

*Primary Examiner*—Creighton Smith
(74) *Attorney, Agent, or Firm*—Ryan, Mason & Lewis, LLP

(57) ABSTRACT

A visual interface to an IVR system is provided to allow an interaction between a user and an interactive voice response (IVR) system to be visually monitored. A visual representation of an audio communication with an agent is generated based on the IVR script. The commands in the IVR scripts can be mapped to a visual representation. One or more fields in the visual representation can be populated with utterances of the caller. The agent can optionally review or update a field in the visual representation that has been populated with an utterance. An agent can optionally alter a flow of the IVR script or intervene in the audio communication.

23 Claims, 7 Drawing Sheets

FIG. 4

```
ABC Bank - Microsoft Internet Explorer
File  Edit  View  Favorites  Tools  Help
Back  →  ⊗  ⌂  |  Search  Favorites  Media  |  ...
Address  https://ivrmachine.abcbank.com/visualappchan/vishan.html    Go  Links
```

ABC Bank – Visual Application Channel

Form: login.asp

Welcome to A B C Bank access line.

What is your account number? ╱ 410-1 account_num: [        ]    [ Approve ] ╌ 420-1

Please enter your pin using touch tones.

pin: [        ]    [ Approve ] ╌ 420-2

[ Submit Form ]    ╲ 410-2

```
<?xml version="1.0" encoding="UTF-8"?>
<vxml version="2.0" xmlns="http://www.w3.org/2001/vxml"
    xmlns:xsi="http://www.w3.org/2001/XMLSchema-instance"
    xsi:schemaLocation="http://www.w3.org/2001/vxml
        http://www.w3.org/TR/voicexml20/vxml.xsd">
<form id="login">
    <block>Welcome to A B C Bank access line.</block>
    <field name="account_num">
        <prompt>What is your account number?</prompt>
        <grammar src="acct.grxml" type="application/srgs+xml"/>
    </field>
    <field name="pin">
        <prompt>Please enter your pin using touch tones.</prompt>
        <grammar src="pin.grxml" type="application/srgs+xml"/>
    </field>
    <submit next="/servlet/validate_login" namelist="account_num pin"/>
</form>
</vxml>
```

FIG. 6

VOICE MAPPING TABLE – 600

| VXML ELEMENT | VISUAL DISPLAY |
|---|---|
| <form> | A GRAPHICAL BOX OUTLINING THE CONTROLS WITHIN THE FORM |
| <field> | <input> – A TEXT BOX WITH A PRECEDING LABEL SET TO THE FIELD NAME. ANY PROMPT WOULD BE LISTED IMMEDIATELY ABOVE THE FIELD LABEL AND TEXT BOX. |
| <menu> | <input> – FOR SIMPLE MENUS, THE INPUT ITEM WOULD BE MAPPED TO A DROPDOWN LIST BOX. FOR MENUS WITH EMBEDDED GRAMMARS, THE INPUT ITEM WOULD BE MAPPED TO A TEXT BOX SIMILAR TO THE <field>. |
| <record> | LABEL TEXT WITH RECORD NAME AND DISPLAY OF THE STATUS OF THE RECORDING. |
| <transfer> | LABEL TEXT WITH TRANSFER NAME. FOR BRIDGED TRANSFERS, THE LABEL WILL INCLUDE STATUS INDICATING THE STATE OF THE TRANSFER. FOR BLIND TRANSFERS, NO STATUS CAN BE DISPLAYED. |
| <object> | LABEL TEXT WITH OBJECT NAME AND STATUS. |
| <link> | <input> – AS A BUTTON WITH THE LABEL BEING SET TO THE NAME OF THE LINK. |
| <block> | LABEL TEXT WITH BLOCK NAME AND STATUS INDICATING IF THE BLOCK HAS BEEN EXECUTED. |
| <initial> | LABEL TEXT WITH INITIAL NAME AND STATUS INDICATING IF THE INITIAL HAS BEEN SATISFIED. |
| <subdialog> | THE EXECUTION FLOW WILL CHANGE TO DISPLAY THE GRAPHICAL VIEW OF THE SUBDIALOG. THE MAPPINGS WILL BE AS LISTED IN THIS TABLE. |

METHOD AND APPARATUS FOR INTERACTIVE VOICE PROCESSING WITH VISUAL MONITORING CHANNEL

FIELD OF THE INVENTION

The present invention relates generally to call centers or other call processing systems and, more particularly, to methods and apparatus for monitoring interactions between a caller and an interactive voice response system in such call centers.

BACKGROUND OF THE INVENTION

Many companies employ call centers to exchange information with customers. Call centers often employ interactive voice response (IVR) systems, such as the Avaya Interactive Response® system, commercially available from Avaya Inc., to provide callers with information in the form of recorded messages and to obtain information from callers using keypad or voice responses to recorded queries. Ports on the IVR systems are often referred to as "automated agents" or "virtual agents."

A number of IVR systems employ the Voice eXtensible Markup Language (VoiceXML) to create IVR scripts. Typically, a media server receives a call, obtains the appropriate VoiceXML page from a dedicated local or remote server and then executes the VoiceXML page for the caller. An IVR typically converts a caller's voice responses into a textual format for computer-based processing. A number of existing IVR systems provide tools for monitoring or debugging the interaction with a caller. For example, a number of IVR systems employ log files or other trace features that allow caller interactions to be analyzed.

While such debugging tools provide an effective mechanism for correcting errors in an IVR system, they typically do not allow modifications to be made in real time as a call progresses. In addition, currently available debugging tools do not allow an agent monitoring the transaction to interact with the IVR application, for example, to intercept, modify or otherwise correct an interaction between the IVR system and a caller. A need therefore exists for improved techniques for monitoring or debugging an IVR system. A further need exists for a visual interface to an IVR system that provides a visual interpretation of the running IVR application.

SUMMARY OF THE INVENTION

Generally, the present invention provides a visual interface to an IVR system. The visual interface provides a visual interpretation of a running IVR application that allows an interaction between a user, such as a caller, and an interactive voice response (IVR) system to be monitored. An audio communication, such as a telephone call from a caller, is processed in a conventional manner in accordance with an IVR script having a plurality of commands. The invention presents a visual representation of the audio communication to an agent based on the IVR script. In one embodiment, the commands in the IVR scripts are mapped to a visual representation.

As a caller speaks with an IVR system, one or more fields in the visual representation can be populated with the utterances of the caller. The agent can optionally review or update a field in the visual representation that has been populated with an utterance. In a further variation, an agent can optionally be presented with one or more of (i) an N-best list of possible choices for an utterance of the caller; (ii) a list of possible choices for the utterance based on a set of utterances permitted by a grammar of an ASR system; (iii) a confidence score for at least one possible choice for the caller utterance; or (iv) a choice of semantic interpretation items or tokens in a natural language understanding system. The monitoring feature provided by the present invention optionally allows an agent to alter a flow of the IVR script or to intervene in the audio communication.

A more complete understanding of the present invention, as well as further features and advantages of the present invention, will be obtained by reference to the following detailed description and drawings.

BRIEF DESCRIPTION OF THE DRAWINGS

FIG. 4 illustrates an exemplary interface for presenting the visual channel of the present invention to the agent;

FIG. 5 illustrates exemplary VXML code for generating the agent interface of FIG. 4;

FIG. 6 is a sample table of an exemplary voice mapping table incorporating features of the present invention.

DETAILED DESCRIPTION

The present invention provides a visual monitoring capability for an IVR system. The visual application channel allows an agent to monitor, interact with and modify the IVR system. In this manner, an agent can monitor the interaction of an IVR script with a caller and intervene, if necessary. The visual application channel provides a mechanism for observing the state/activity of an existing automated dialog session and for changing the state of such a session, if necessary.

Figure 1:
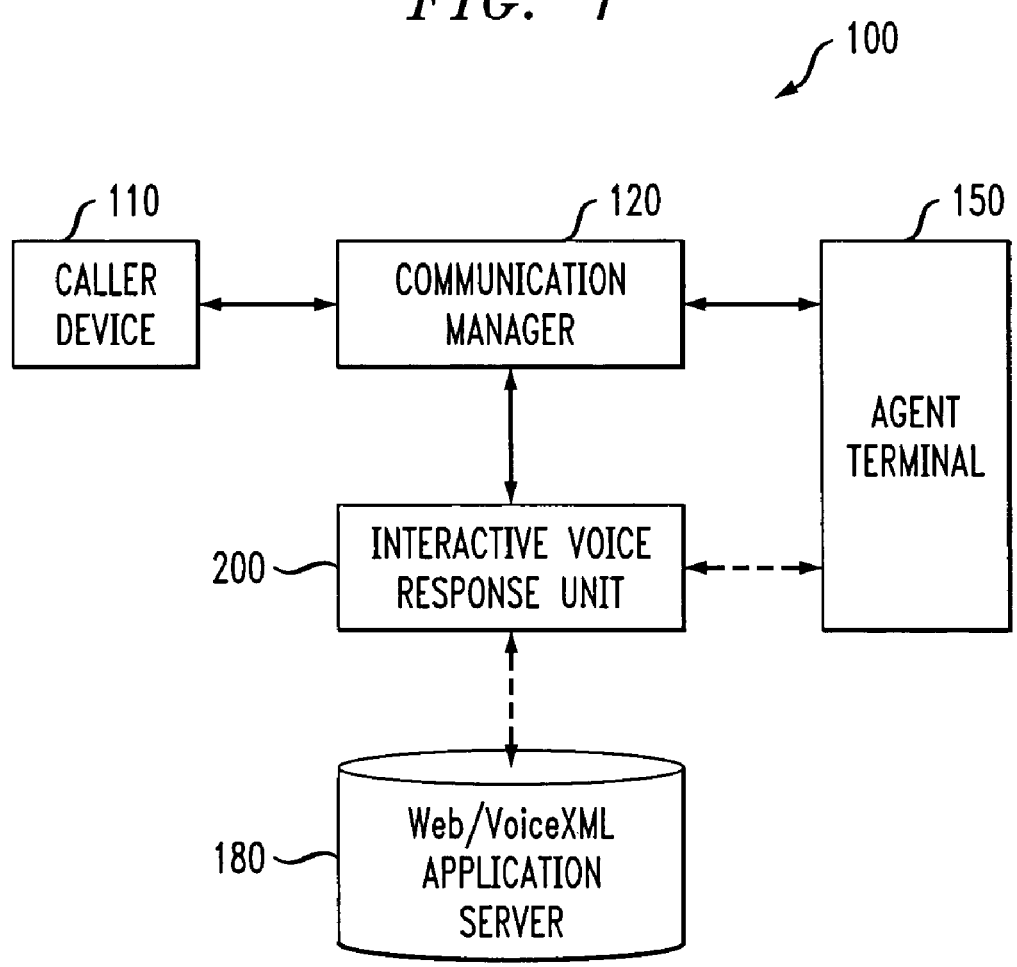
FIG. 1 illustrates an interactive voice processing system in accordance with the present invention.

FIG. 1 illustrates an interactive voice processing system 100 in accordance with the present invention. As shown in FIG. 1, the interactive voice processing system 100 includes a caller device 110, a communication manager 120, one or more agent terminals 150, a web/voiceXML application server 180, and an interactive voice response (IVR) unit 200, discussed below in conjunction with FIG. 2, each interconnected, for example, by a wide or local area network (LAN) or a combination thereof (not shown). It is noted that the solid lines in the figures indicate a voice channel, while the dashed lines indicate a data path, as discussed further below in conjunction with FIG. 2.

While the exemplary embodiment of the IVR unit 200 employs voiceXML (VXML), other techniques that provide HTML-based support for IVR, such as Speech Application Language Tags (SALT), described, for example, in Speech Application Language Tags (SALT), Technical White Paper, downloadable from www.saltforum.org, could also be employed, as would be apparent to a person of ordinary skill in the art, based on the disclosure herein. SALT is a speech interface markup language that extends existing markup languages to enable multi-modal and telephony access to the Internet.

The caller device 110 may be embodied as any communication device that allows a caller to establish an audio communication with a call center, such as a conventional, cellular or IP telephone. The communication manager 120 may be embodied, for example, as the Avaya Communications Manager®, a PBX product commercially available from Avaya Inc. of Basking Ridge, N.J., as modified herein to carry out the features and functions of the present invention. The communication manager 120 can process traditional telephone communications, IP telephony communications or SIP-based communications. It is noted that a single processor or server can perform the functions of both the communication manager 120 and the IVR unit 200.

Figure 2:
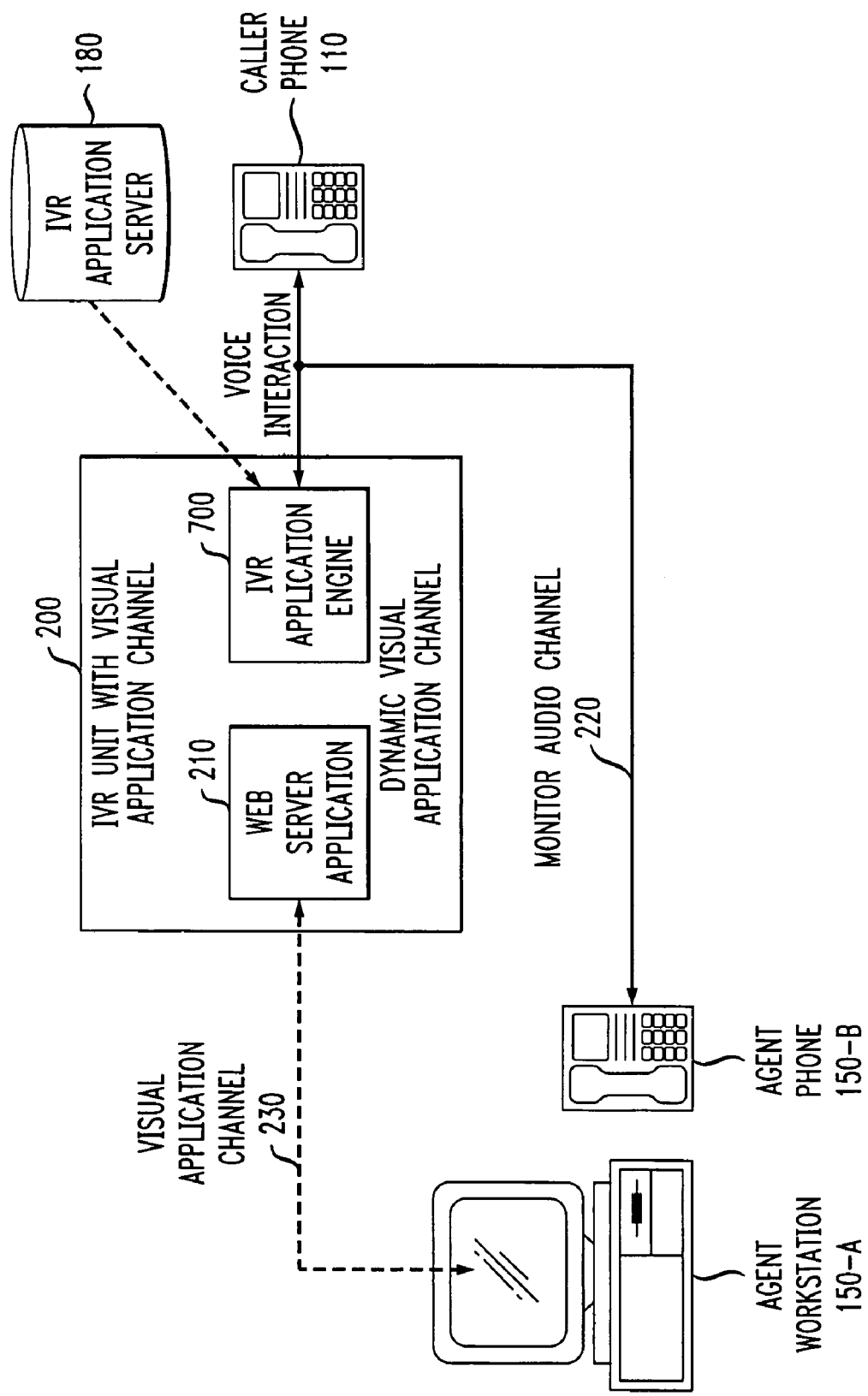
FIG. 2 illustrates the interactions between the IVR unit and caller and agent of FIG. 1 in further detail.

FIG. 2 illustrates the interactions between the IVR unit 200 and the caller device 110 and agent terminal 150 of FIG. 1 in further detail. As shown in FIG. 2, the exemplary agent terminal 150 comprises a workstation 150-A and a telephone 150-B. The exemplary IVR unit 200 includes a web server 210 and an IVR application engine 700, discussed below in conjunction with FIG. 7.

As discussed further below, the IVR application engine 700 (including the IVR scripts) may be written, for example, in VoiceXML and stored on a central VoiceXML application server 180. As discussed further below in conjunction with FIG. 7, the VoiceXML application server 180 is presented with requests for VXML pages in the exemplary embodiment from a VXML process 700 that supports the IVR capabilities of the automated IVR agent. The VoiceXML application server 180 creates a session with the VXML process 700, and returns the first page of the IVR application encoded in VXML script to the VXML process 700 for interpretation. For each subsequent request, the VoiceXML application server 180 will obtain or dynamically create (or both) subsequent documents to be sent to the requesting VXML process 700 for rendering. When the interaction with the caller is finished, the final VXML page sent from the VoiceXML application server 180 to the VXML process 700 will instruct the VXML process 700 to terminate or transfer the call to the appropriate call center agent or application. The VoiceXML application server 180 may be embodied, for example, as a Microsoft Web server with Internet Information Services (IIS) package installed and enabled, commercially available from Microsoft Corp. of Redmond, Wash., as modified herein to carry out the features and functions of the present invention.

The caller interacts with the IVR unit 200 running the VXML application. As discussed below in conjunction with FIG. 7, the agent can listen to the interaction between the caller and the VXML application by means of an audio channel 220. In addition, the agent can see the interaction between the caller and the VXML application by means of a visual channel 230 that indicates the state of the VXML application. The visual channel 230 may be, for example, rendered as a web page. As discussed hereinafter, the agent can employ the visual channel 230 to modify the variables or fields set by the VXML application or the agent can intercept the call from automation, if necessary.

As shown in FIG. 2, the IVR application engine 700 can run IVR scripts generated by the IVR application server 180, interacting with a caller employing a telephone 110. In the exemplary embodiment, the IVR application server 180 hosts the actual IVR script pages and page generation. The IVR application engine also interacts with a Web application server 210. When requests arrive to the web server 210 from an agent workstation 150-A for a visual version of the current IVR application, the IVR application engine 700 generates the appropriate pages. These pages are then sent through standard web connections to the web browser of the agent workstation 150-A. When responses are entered by the agent workstation 150-A, the result is posted to the web server 210 and the IVR application engine 700 is notified and takes appropriate action. As page changes occur from interaction between the IVR and the caller, the changes are sent through a page refresh to the agent workstation 150-A. The agent also optionally has a "listen only" audio line 220 between the headset 150-B of the agent and the audio channel of the caller and IVR. This enables the Agent to make decisions about the progress and direction of the IVR dialog, and to make corrections, as necessary.

It is noted that the selection and authorization of an appropriate agent to handle a particular call is outside the scope of the present invention and may be implemented using known automatic call distribution (ACD) techniques. In addition, any data security issues, such as the protection and encryption of private caller information is also outside the scope of the present invention and may be implemented using any suitable technique.

Figure 3:
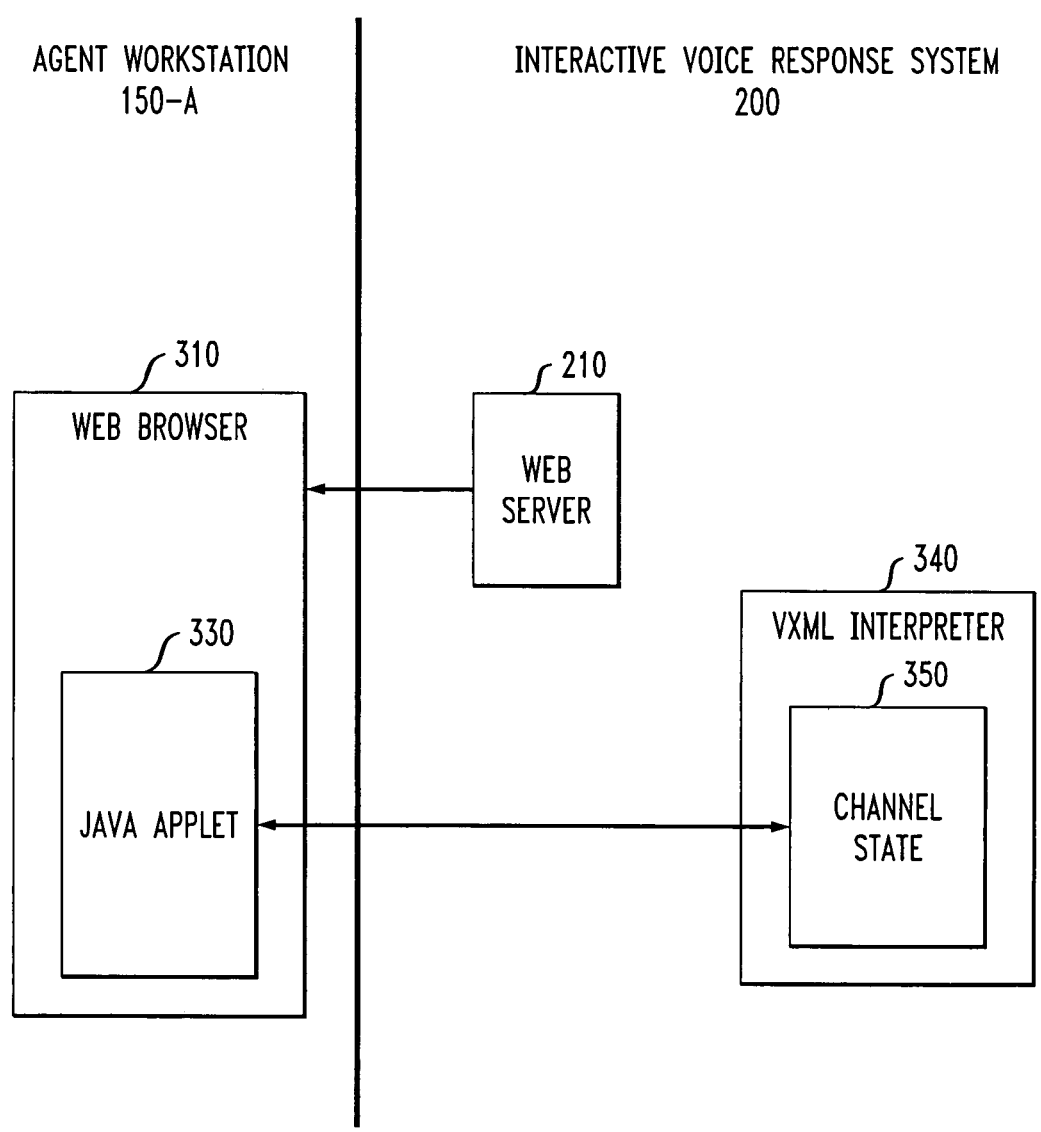
FIG. 3 illustrates the interaction between the IVR unit and the agent terminal in further detail.

FIG. 3 illustrates the interaction between the IVR unit 200 and the agent terminal 150 in further detail. As shown in FIG. 3, the agent terminal 150 includes a web browser 310 that executes one or more Java Applets 330. The IVR unit 200 includes the web server 210 and a VXML interpreter 340 that monitors the channel state 350. The web server 210 may be embodied, for example, as an Apache web server, described, for example, at www.apache.org. While Java is used in the illustrative embodiment, any browser supported method that has the ability to manage a socket connection and produce the needed visual components could also be employed, such as ActiveX objects. Thus, the web server 210 may alternatively be implemented using any socket-based protocol.

In one embodiment, a call center agent can use the visual application channel of the present invention by logging into the running IVR application from the web browser 310. The Java Applet 330 will initiate a connection to the VXML interpreter via an IP address/port number specified by the web page. Once the socket connection is up, the VXML interpreter 340 will download a definition for all of the objects on each VXML page that it downloads. When the Form Interpretation Algorithm (FIA) is executing, the VXML interpreter 340 will send update notifications to the Java Applet 330 as the selection, collection and processing phases. The web page will then display the current IVR application state in a visual form. This displayed page is fully enabled allowing the call center agent to answer prompts for the caller, direct the dialog, or other actions made available by the IVR application. As the caller navigates through the IVR application, the web page will dynamically update with the new state and position within the IVR application.

When the agent chooses to intercede, the VXML interpreter 340 can optionally play a stall phrase to the caller to provide some feedback to the caller while the change is being made (e.g., a message such as "one moment please"). The caller will not know that this intervention took place and the execution will resume after the change is made.

FIG. 4 illustrates an exemplary interface 400 for presenting the visual channel of the present invention to the agent on the agent workstation 150-A. As shown in FIG. 4, the interface includes one or more fields 410-1, 410-2 to be populated with information obtained from the caller. As previously indicated, a call center agent can use the visual application channel by logging into the running IVR application from a web browser. The web page will then display the current IVR application state in a visual form, shown in FIG. 4. The page 400 allows the call center agent, for example, to answer prompts for the caller, direct the dialog, and other actions made available by the IVR application. As the caller navigates through the IVR application, the web page will dynamically update with the new state and position within the IVR application.

During runtime, the agent can monitor the audio interaction between the caller and the IVR via a switch observation feature. The VXML interpreter 340 is sending messages to the Java applet 330 to indicate when a field is active. Inactive input field items may optionally be disabled (e.g., grayed out) on the agent's display. When a field is filled with input from the caller, the VXML interpreter 340 sends the input data to the agent display and waits a brief period for the agent to override the input. The agent may do this, for example, by entering alternate text into the appropriate visual dialog input item. Clicking on the "Approve" button 420-1, 420-2 corresponding to a given field 410 commits the field contents back to the VXML interpreter 340, who then proceeds to process the input as per normal VXML form interpretation. If the agent does not change the input field, but presses the "Approve" button 420, then the original contents are used by the VXML interpreter. A "Submit Form" button 430 submits the contents of the entire form to the VXML interpreter 340, who then proceeds to process the input as per normal VXML form interpretation.

The agent user interface 400 should be designed to avoid lengthy delays when soliciting agent input. In an exemplary embodiment, there are several possible ways to keep the interface 400 simple and fast. For example, voice input on the part of the caller is limited by the scope of the speech grammar. If the agent interface 400 provides a list of allowed responses and a "nomatch" function, then the agent would only need to select a target from a drop down list. This list could be downloaded to the agent workstation 150-A when the Java Applet 330 is loaded or when the VXML page loads. The field name could be used as the key to finding the mapping. Most ASR vendors supply tools that will provide all possible sequences from a grammar. The N-best results could be used to constrain the selection to only the top few choices. The VXML utterance, semantic interpretation, and confidence score can be shown to the agent for each N-best result.

If speech recognition is reasonably accurate, it may be useful to allow for a confidence threshold to only require intervention when the confidence for the caller's utterance was low. The confidence threshold could be either a per-field or an overall value. If the confidence threshold is per-field, then the field name could be used as a key and could be downloaded from the web server.

FIG. 5 illustrates exemplary VXML code 500 that controls the interaction between the IVR application engine 700 and a caller 110 and which can be translated in accordance with the present invention to provide a visual channel 230 to the agent 150. As discussed below in conjunction with FIGS. 6 and 7, the VoiceXML tags in the code 500 need to be mapped to the visual domain to generate the interface 400.

FIG. 6 is a sample table of an exemplary voice mapping table 600 for the exemplary VXML code incorporating features of the present invention. The voice mapping table 600 is employed by the IVR application engine 700 to generate the visual channel in accordance with the present invention. In particular, the voice mapping table 600 is used to map the exemplary VoiceXML tags in the VXML code 500 to the visual domain to generate the interface 400. For example, as shown in FIG. 6, a <field> VXML element is mapped by taking the text label associated with the field, and presenting it as a text box with a preceding label set to the field name. Any prompt would be listed immediately above the field label and text box. Alternative mapping tables could be produced for other non-VXML implementations of the IVR, such as SALT, as would be apparent to a person of ordinary skill in the art, based on the disclosure herein.

Figure 7:
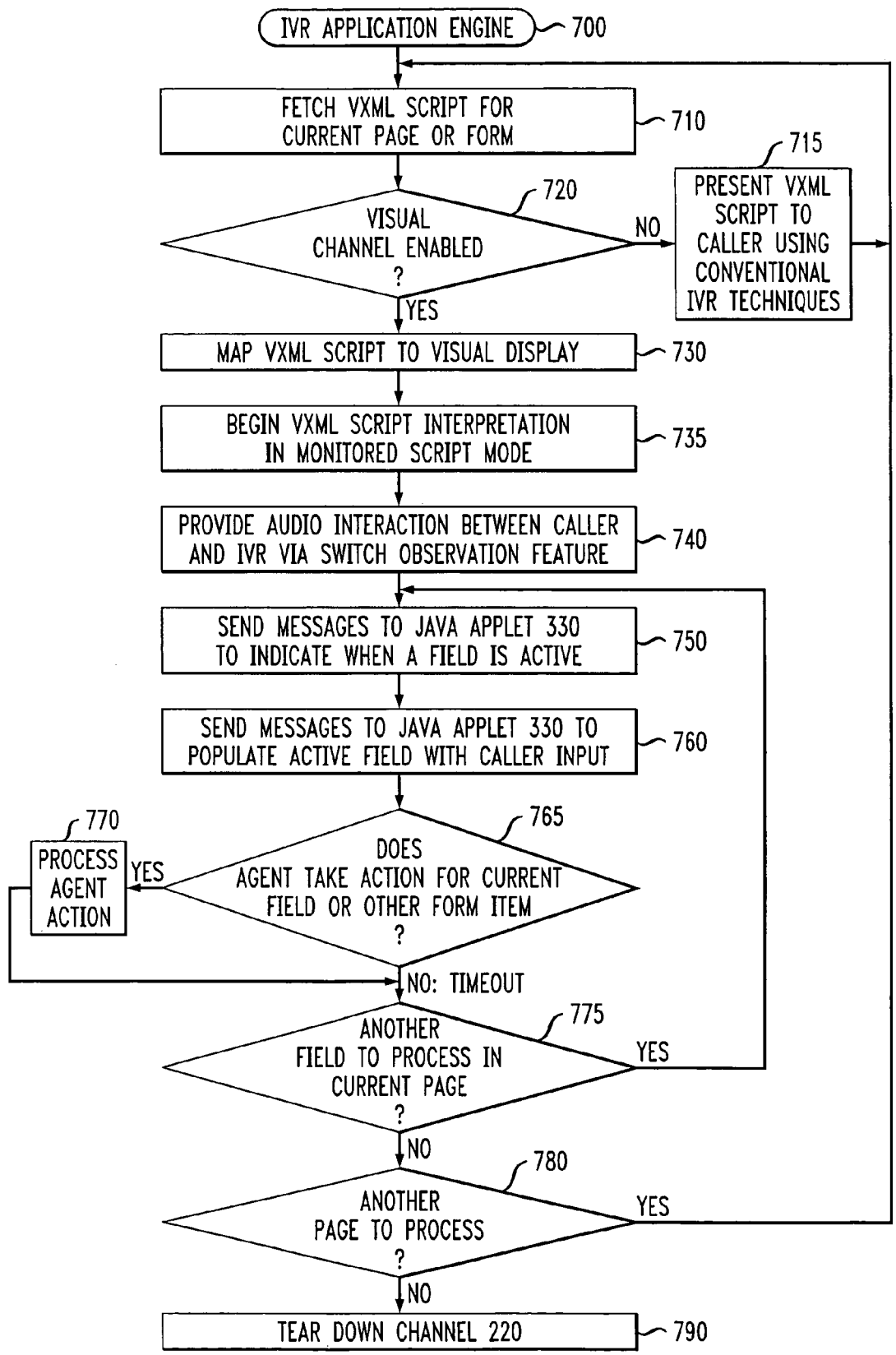
FIG. 7 is a flow chart describing an exemplary implementation of the IVR application engine.

FIG. 7 is a flow chart describing an exemplary implementation of the IVR application engine 700. As shown in FIG. 7, the IVR application engine 700 initially fetches the VXML script during step 710, for example, from the IVR application server 180. Thereafter, the IVR application engine 700 presents the VXML script to the caller using conventional IVR techniques during step 715. A test is performed during step 720 to determine if the visual channel is enabled. If it is determined during step 720 that the visual channel is not enabled, then the VXML script is presented to the caller during step 715 using conventional IVR techniques, before program control returns to step 710 and continues fetching VXML scripts for presentation in a conventional manner.

If, however, it is determined during step 720 that the visual channel is enabled, then program control proceeds to step 730 where the VXML script is mapped to the visual display 400 using the voice mapping table 600, as discussed above in conjunction with FIG. 6. The visual mapping may optionally be performed in accordance with one or more style sheets or rules that define the presentation of the visual content, such as font, color, layout or other formatting issues. Thus, when requests arrive to the web server 210 from an agent workstation 150-A for a visual version of the current IVR application, the IVR application engine 700 generates the appropriate pages. The VXML script interpretation is initiated during step 735 in a monitored script mode. The audio interaction between the caller and the IVR is provided to the agent, for example, via the switch observation feature, during step 740.

The VXML interpreter 340 sends messages to the Java Applet 330 during step 750 to indicate when a given field 410 is active, or if there is another state change, such as field or variable changes to be presented on the visual channel, and sends messages to the Java Applet 330 during step 760 to populate the currently active field with any caller input. For example, the agent can be presented during step 760 with (i) an N-best list of possible choices for an utterance of the caller; (ii) a list of possible choices for the utterance based on a set of utterances permitted by a grammar of an ASR system; (iii) a confidence score for at least one possible choice for the caller utterance; or (iv) a choice of semantic interpretation items or tokens in a natural language understanding system.

A test is performed during step 765 to determine if the agent takes action for the current field or another available form item. If it is determined during step 765 that the agent takes action for the current field, then program control proceeds to step 770 where the action is processed before proceeding to step 775. For example, if the agent selects to take over control of a call from the automated system, the Java Applet signals the VXML interpreter. The override capability will be implemented in a fashion similar to breakpointing in a normal code debugger. It will not require any changes to the VXML script, but will be implemented at one or more fixed points within the VXML interpreter.

If, however, it is determined during step 765 that the agent does not take action for the current field (for example, within a predefined period of time), then a further test is performed during step 775 to determine if there is another field to process. If there is another field to process, then program control returns to step 750 and continues in the manner described above. If there is not another field to process, then program control proceeds to step 780, where a further test is performed to determine if there is another page or form to process. If it is determined during step 780 that there is another page or form to process then program control returns to step 710 and continues processing the next page or form in the manner described above. If, however, it is determined during step 780 that there are no more pages or forms to process, then the visual channel 220 is removed during step 790 before program control terminates.

In this manner, the present invention provides a VXML application debugger that allows an agent to see what the dialog is doing during a call in order to help understand call flow issues. Thus, during the deployment of an application, the visual channel of the present invention can help spot issues where ASR grammars are incomplete or where prompting may be misleading. In a real-time interaction with a caller, the visual channel of the present invention can assist endangered automated sessions by allowing an agent to listen to a caller that is having repeated errors when running the automated dialog. The agent can either correct an ASR mistake, or steal the call. Furthermore, the visual channel of the present invention permits the agent shadow to ensure that the speech recognition is accurate.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for monitoring an interaction between a user and an interactive voice response (IVR) system, comprising:

processing an audio communication from said user in accordance with an IVR script having a plurality of commands; and presenting a visual representation of said audio communication to an agent based on said IVR script, wherein said visual representation is presented substantially simultaneously with said audio communication and comprises at least one field to be populated with information obtained from said user, wherein said information populated in said field can be updated by said agent.

2. The method of claim 1, further comprising the step of mapping said plurality of commands to said visual representation.

3. The method of claim 1, further comprising the step of populating a field in said visual representation with an utterance of said user.

4. The method of claim 3, further comprising the step of transcribing said utterance of said user to populate said field in said visual representation.

5. The method of claim 3, further comprising the step of allowing said agent to review said field in said visual representation populated with an utterance of said user.

6. The method of claim 5, wherein said agent is presented with an N-best list of possible choices for said utterance of said user.

7. The method of claim 5, wherein said agent is presented with a list of possible choices for said utterance of said user based on a set of permitted utterances.

8. The method of claim 5, wherein said agent is presented with a confidence score for at least one possible choice for said utterance of said user.

9. The method of claim 5, wherein said agent is presented with a choice of semantic interpretation items in a natural language understanding system.

10. The method of claim 3, further comprising the step of allowing said agent to update said field in said visual representation populated with an utterance of said user.

11. The method of claim 1, further comprising the step of allowing said agent to alter a flow of said IVR script.

12. The method of claim 1, further comprising the step of allowing said agent to intervene in said audio communication.

13. The method of claim 1, further comprising the step of providing an audio portion of said audio communication to said agent.

14. An apparatus for monitoring an interaction between a user and an interactive voice response (IVR) system, comprising:

a memory; and at least one processor, coupled to the memory, operative to:

process a audio communication from said user in accordance with an IVR script having a plurality of commands; and present a visual representation of said audio communication to an agent based on said IVR script, wherein said visual representation is presented substantially simultaneously with said audio communication and comprises at least one field to be populated with information obtained from said user, wherein said information populated in said field can be updated by said agent.

15. The apparatus of claim 14, wherein said processor is further configured to map said plurality of commands to said visual representation.

16. The apparatus of claim 14, wherein said processor is further configured to populate a field in said visual representation with an utterance of said user.

17. The apparatus of claim 16, wherein said processor is further configured to transcribe said utterance of said user to populate said field in said visual representation.

18. The apparatus of claim 16, wherein said processor is further configured to allow said agent to review said field in said visual representation populated with an utterance of said user.

19. The apparatus of claim 16, wherein said processor is further configured to allow said agent to update said field in said visual representation populated with an utterance of said user.

20. The apparatus of claim 14, wherein said processor is further configured to allow said agent to alter a flow of said IVR script.

21. The apparatus of claim 14, wherein said processor is further configured to allow said agent to intervene in said audio communication.

22. The apparatus of claim 14, wherein said processor is further configured to provide an audio portion of said audio communication to said agent.

23. An article of manufacture for monitoring an interaction between a user and an interactive voice response (IVR) system, comprising a machine readable medium containing one or more programs which when executed implement the steps of:

processing a audio communication from said user in accordance with an IVR script having a plurality of commands; and presenting a visual representation of said audio communication to an agent based on said IVR script, wherein said visual representation is presented substantially simultaneously with said audio communication and comprises at least one field to be populated with information obtained from said user, wherein said information populated in said field can be updated by said agent.

* * * * *